(12) United States Patent
Xie et al.

(10) Patent No.: US 10,509,462 B2
(45) Date of Patent: Dec. 17, 2019

(54) METHOD AND SYSTEM FOR IDENTIFYING FEATURE OF OBJECT

(71) Applicant: HiScene Information Technology Co., Ltd, Shanghai (CN)

(72) Inventors: Binglong Xie, Shanghai (CN); Chunyuan Liao, Shanghai (CN)

(73) Assignee: HISCENE INFORMATION TECHNOLOGY CO., LTD, Shanghai (CN)

(*) Notice: Subject to any disclaimer, the term of this patent is extended or adjusted under 35 U.S.C. 154(b) by 243 days.

(21) Appl. No.: 15/456,601

(22) Filed: Mar. 13, 2017

(65) Prior Publication Data

US 2018/0247402 A1 Aug. 30, 2018

(30) Foreign Application Priority Data

Feb. 24, 2017 (CN) .......................... 2017 1 0104277

(51) Int. Cl.
| | |
|---|---|
| *G06F 3/01* | (2006.01) |
| *G06F 3/03* | (2006.01) |
| *G06T 19/00* | (2011.01) |
| *G06F 3/0482* | (2013.01) |
| *G06F 3/0484* | (2013.01) |
| *G06F 1/16* | (2006.01) |

(52) U.S. Cl.
CPC .............. *G06F 3/011* (2013.01); *G06F 1/163* (2013.01); *G06F 3/017* (2013.01); *G06F 3/0304* (2013.01); *G06F 3/0482* (2013.01); *G06F 3/04842* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2012/0293935 | A1* | 11/2012 | Sherlock | G06F 1/163 361/679.03 |
| 2013/0218721 | A1* | 8/2013 | Borhan | G06Q 20/322 705/26.41 |
| 2015/0371445 | A1* | 12/2015 | Karrer Walker | G06K 9/00442 345/632 |
| 2016/0042566 | A1* | 2/2016 | Mao | G06T 19/006 463/32 |
| 2016/0063327 | A1* | 3/2016 | Yasutake | G06K 9/00671 345/633 |
| 2016/0093106 | A1* | 3/2016 | Black | G06K 9/00624 345/633 |
| 2016/0179336 | A1* | 6/2016 | Ambrus | G02B 27/017 715/768 |
| 2017/0287217 | A1* | 10/2017 | Kim | B62J 27/00 |

(Continued)

*Primary Examiner* — Talha M Nawaz
(74) *Attorney, Agent, or Firm* — Jun He Law Offices P.C.; James J. Zhu

(57) ABSTRACT

A method and system for identifying a feature of an object based on an AR device is provided. The AR device is capable of superimposing a virtual reality scene on a real reality scene. The method includes: an identification obtaining step of obtaining identification information corresponding to an object to be inspected; a tag selecting step of checking the object and using the AR device to select at least one tag based on a visual feature of the object; and a tag associating step of using the AR device to associate the at least one selected tag with the identification information of the object.

14 Claims, 6 Drawing Sheets

(56) References Cited

U.S. PATENT DOCUMENTS

| | | | | |
|---|---|---|---|---|
| 2017/0322119 A1* | 11/2017 | Da Silva | ................ | G01M 99/00 |
| 2018/0150899 A1* | 5/2018 | Waldron | ............ | G06Q 30/0633 |
| 2018/0150903 A1* | 5/2018 | Waldron | ............ | G06Q 30/0639 |
| 2018/0276882 A1* | 9/2018 | Harviainen | ............ | G06T 19/006 |

* cited by examiner

METHOD AND SYSTEM FOR IDENTIFYING FEATURE OF OBJECT

CROSS REFERENCE TO RELATED APPLICATIONS

The present application claims priority to Chinese Patent Application No. 201710104277.2 filed on Feb. 24, 2017, the content of which is incorporated into the present application by reference.

TECHNICAL FIELD

The present disclosure relates to a technical field of a wearable device, in particular, to a method and a system for identifying a feature of an object.

BACKGROUND

At the factory assembly line, each workpiece or product needs to be checked (or inspected) in order to identify any product detects. In a conventional checking method, the checking process is performed by manual operations. Specifically, a worker checks the product and, if a defect is found in the product, a mark indicating the defect is drawn or marked on the product.

Although the above-mentioned defect marking method is relatively simple, the worker needs to manually record the defect information via pens and paper (or computers) in subsequent processes, which requires the worker keeping his hands busy, increases the complexity of the work and the burden of the worker, and is prone to error. In addition, since the defect data is manually processed at the later stage, it is difficult to monitor the defects of the products in real time during the defect marking process, which is not helpful for timely adjusting the production process.

Therefore, there is a need to provide an improved method for identifying a feature of a product.

SUMMARY

According to an aspect of the present disclosure, a method for identifying a feature of an object based on an augmented reality (AR) device is provided. The AR device is capable of superimposing a virtual reality scene on a real reality scene. The method includes: an identification obtaining step of obtaining identification information corresponding to an object to be inspected; a tag selecting step of checking the object and using the AR device to select at least one tag based on a visual feature of the object; and a tag associating step of using the AR device to associate the at least one selected tag with the identification information of the object.

According to another aspect of the present disclosure, a system for inspecting an object is provided. The system includes: a receiving station of an object, configured to carry the object; a predetermined tag area including at least one tag, each of which corresponds to one type of visual feature; and an AR device, wherein the AR device includes: a scanning unit configured to scan the predetermined tag area; a detecting unit configured to detect a user's selection; a selecting unit configured to select one tag from the at least one tag in the predetermined tag area according to the user's selection; and an associating unit configured to associate the selected tag with identification information of the object.

According to another aspect of the present disclosure, a system for inspecting an object is provided. The system includes: a receiving station, configured for receiving and carrying an object to be inspected; a predetermined tag area, including at least one tag, each tag corresponding to one type of visual feature of said object; and an AR device, including: a scanning unit configured for scanning the predetermined tag area to obtain at least one tag; and an associating unit configured for associating said obtained at least one tag with identification information of the object.

According to another aspect of the present disclosure, a system for inspecting an object is provided. The system includes: a receiving station configured for carrying an object to be inspected; an AR device, including: a display unit configured to display at least one tag, wherein each tag corresponds to a type of visual feature; a selecting unit configured to detect a user's selection, so as to select one tag according to the user's selection; and an associating unit configured to associate the selected tag with identification information of the object.

The method for identifying a feature of an object and the system for inspecting an object of the present disclosure can be applied in many applications. In these applications, the operator can record the features of the object directly through the AR device, and there is no need to record via pens and paper, or input relevant data of the object's features via another electronic device, such as a computer. This method greatly improves the processing efficiency and saves the operating time. The method for identifying a feature of an object and the system for inspecting an object of the present disclosure are particularly suitable for use in industrial production lines. The operator can wear an AR device and perform operations for identifying a feature of an object, such as identifying product defects and marking them. With help of the AR device, the operator can operate with their eyes and head movements, free their hands from touching various switches or buttons, so that they can focus on inspecting product defects. In addition, since there is no need for voice input in certain embodiments, it is also suitable for the noisy factory environment.

While the foregoing is an overview of the present disclosure, there may be instances in which the details are simplified, summarized, and omitted, and those skilled in the art will recognize that this is illustrative only and is not intended to limit the scope of the present application in any way. This summary is neither intended to identify key features or essential features of the claimed subject matter, nor intended to be an aid for determining the scope of the claimed subject matter.

BRIEF DESCRIPTION OF THE DRAWINGS

The aforementioned features and other features of the present disclosure will be fully understood by reading the following description by referring to the accompanying drawings and the appended claims. It will be understood that, these accompanying drawings merely illustrate certain embodiments in accordance with the present disclosure and should not be considered as limitation to the scope of the present disclosure. Unless otherwise specified, the accompanying drawings need not be proportional, and similar reference characters generally denote similar elements.

DETAILED DESCRIPTION

Figure 1:
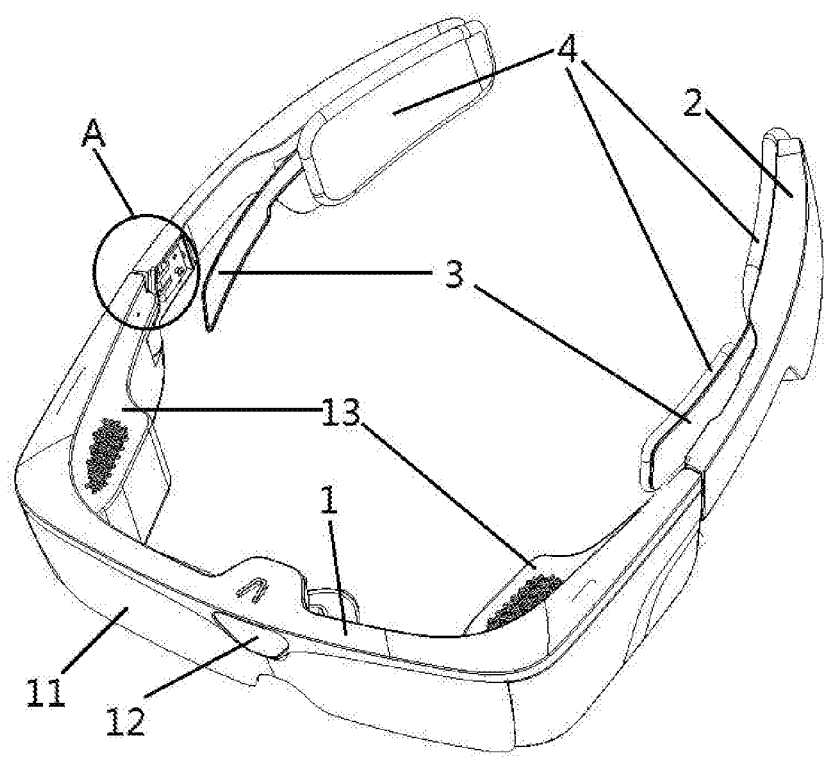
FIG. 1 illustrates an augmented reality (AR) device according to an embodiment of the present disclosure.

In the following detailed description, reference is made to the accompanying drawings that form a part thereof. In the drawings, similar reference numbers generally indicate similar parts unless the context clearly dictates otherwise. The illustrative embodiments described in the detailed description, the drawings, and the claims are not intended to be limiting. Other embodiments may be utilized and other changes may be made without departing from the spirit or scope of the subject matter of the present disclosure. It is to be understood that various aspects of the present disclosure, as set forth in the present disclosure that are generally described herein and illustrated in the accompanying drawings, may be configured, substituted, combined, or contemplated in a variety of different configurations, all of which expressly constitute a part of this disclosure.

FIG. 1 illustrates a schematic diagram of an augmented reality (AR) device 10 according to an embodiment of the present disclosure.

As illustrated in FIG. 1, the AR device 10 includes a glasses frame 1, a pair of glasses legs 2, a pair of elastic clamping pieces 3 and soft supporting layers 4. By means of these mechanical components, the AR device 10 can be stably worn on a user's head.

In an embodiment, the glasses frame 1 includes a front portion and two side portions laterally positioned at two sides of the front portion. The side portions extend a distance from the front portion and in a direction vertical to the front portion. According to an embodiment, each of the glasses legs 2 is mounted at one of the side portions.

Furthermore, each of the glasses legs 2 includes a first end connected to one of the side portions and a second end having an inner side to abut on a user's head. In addition, the second end of each of the glasses legs 2 is inwardly bended to form a first arc portion.

In an embodiment, each of the glasses legs 2 includes a clamping mechanism. The clamping mechanism includes the elastic clamping piece 3 disposed at an inner side of the second end of each glasses legs 2. In addition, the elastic clamping piece 3 is extended toward the first end of each glasses legs 2 and has a free end inwardly bended to form a second arc portion. By the combination of the first and second art portions, a better fit between smart glasses and a head can be achieved.

According to an embodiment of the present disclosure, the glasses legs 2 are made of aluminum alloy Al6063. In addition, the elastic clamping piece 3 can be made of stainless steel spring pieces.

According to an embodiment, the soft supporting layers 4 can be configured at inner sides of the first and/or second arc portions. Specifically, according to an embodiment of the present disclosure, the soft supporting layers 4 are rubber and/or foam layers. By using the soft supporting layers 4, user experience would be improved. For example, pressure on a user's head would be reduced, friction would be increased, and the smart glasses will be more stable and comfortable to wear.

Each of the glasses legs 2 and the glasses frame 1 can be interconnected by an elastic adapting piece A.

In addition to the components described above, the AR device 10 further includes shading lenses 11 disposed at the glasses frame 1, a depth camera module 12 disposed at center of the front portion of the glasses frame 1, and optic modules 13 disposed at the side portions of the glasses frame 1.

According to another embodiment, the shading lenses 11 have an integrated structure.

According to an embodiment, the depth camera module 12 and the optic modules 13 are coupled to a control circuit board. The depth camera module 12 is coupled to the control circuit to provide thereto signals of operating gestures being collected. The optic module 13 functions to emit light toward an imaging lenses, thereby bring formation of image on imaging lenses.

According to an embodiment, the AR device 10 further includes an imaging lenses (not shown) positioned behind the shading lenses 11. The imaging lenses can be, e.g., semi-permeable and semi-reflecting lenses/membranes, or holographic diffraction waveguide gratings, or other suitable imaging components. For a user who wears the smart glasses, the imaging lenses constitute a display screen, on which display content of the smart wearable glasses, e.g., graphic user interfaces, can be observed.

It is understood that the present disclosure does not confine imaging principle of head-mounted display devices. Although the AR device of FIG. 1 is denoted as an AR glasses, other types of AR devices, such as AR helmets, are also within the scope of the present application in practical applications.

Since the AR device 10 shown in FIG. 1 is an AR glasses, a user can see both virtual contents on the imaging lenses (i.e., a display) and real objects and background in actual environment through the imaging lenses and the shading lenses 11. In other words, the AR device can superimpose a virtual reality scene on a real reality scene. In addition, the AR device 10 may detect an entity shape or color in the background by means of the depth camera module 12 and/or other imaging modules, and detect gesture operations or the like that represent user selections. It will be appreciated that, in some other embodiments, the AR device may also include other types of modules for detecting user selection operations, such as microphones, inertial sensors, buttons, and the like. These different types of detection modules may detect, for example, a gesture signal, a voice signal, a head movement signal, or a key press signal, thereby determining a user to select a corresponding operation.

In view of the above features of the AR device, a method for identifying a feature of an object by using an AR device is provided this disclosure. An operator can wear the AR device and check the object via the AR device to determine whether there is a certain feature, such as a human or machine-visible product defect, in the object. At the same time, the operator can also use the AR device to select or determine a tag corresponding to the visual feature of the object.

Figure 2:
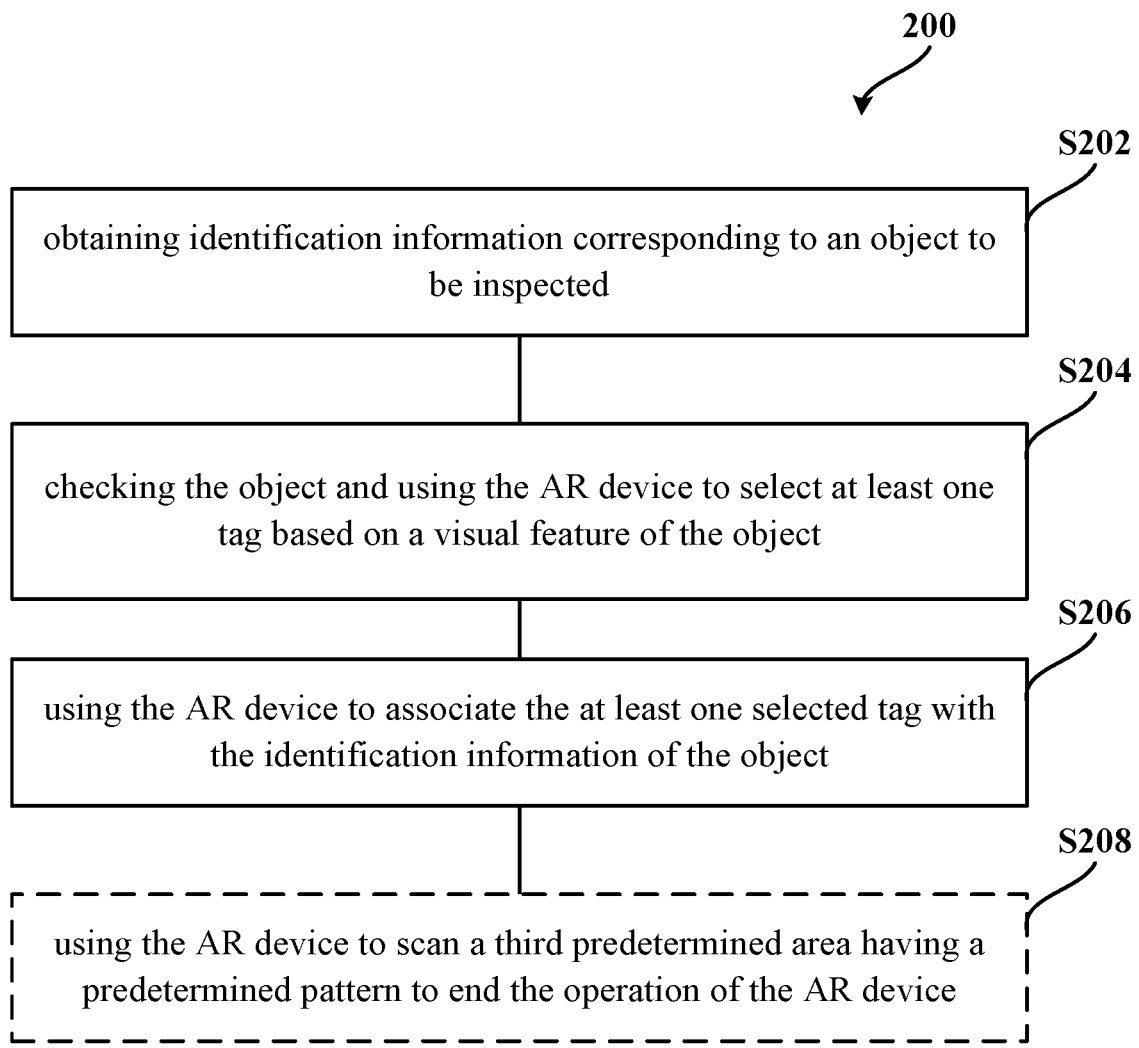
FIG. 2 illustrates a flow chart of a method 200 for identifying a feature of an object based on an AR device according to an embodiment of the present disclosure.

FIG. 2 illustrates a flow chart of a method 200 for identifying a feature of an object based on an AR device according to an embodiment of the present disclosure.

As shown in FIG. 2, in step S202, an object to be inspected is provided, and identification information corresponding to the object is obtained. For example, the object may be placed at a checking station on an assembly line (for example, a receiving station of the object), and an operator of the checking station is conducting or preparing for the inspection of the object. The object may have labels, such as an RFID or a bar code label. The operator can scan the object with a corresponding label scanning device, so as to obtain the identification information corresponding to the object (for example, identification information uniquely identifying the object). It will be appreciated that, in some other examples, the identification information of the object may also be input by the operator in other ways, for example, using a keyboard, a mouse, or a voice input device.

In some embodiments, the AR device, such as the AR device shown in FIG. 1, may include a camera or a voice input device, so that the operator may also scan the object or process the object in other ways by the AR device to obtain its corresponding identification information.

Next, in step S204, the operator checks the object and selects at least one tag by using the AR device based on a feature (e.g., a visual feature) of the object. The visual features of the object may be a visible product defect, or other abnormal features. These visual feature may be directly observed by a visual inspection of the operator, so wearing the AR device will not affect the operator to inspect the visual feature. In the following embodiments, a human visible product defect is taken as an example of the visual feature of the object, but it should be understood that the scope of the present application is not limited thereto. For example, the visual feature may also be a visual signal output by a special apparatus used for inspecting the object.

Figure 3:
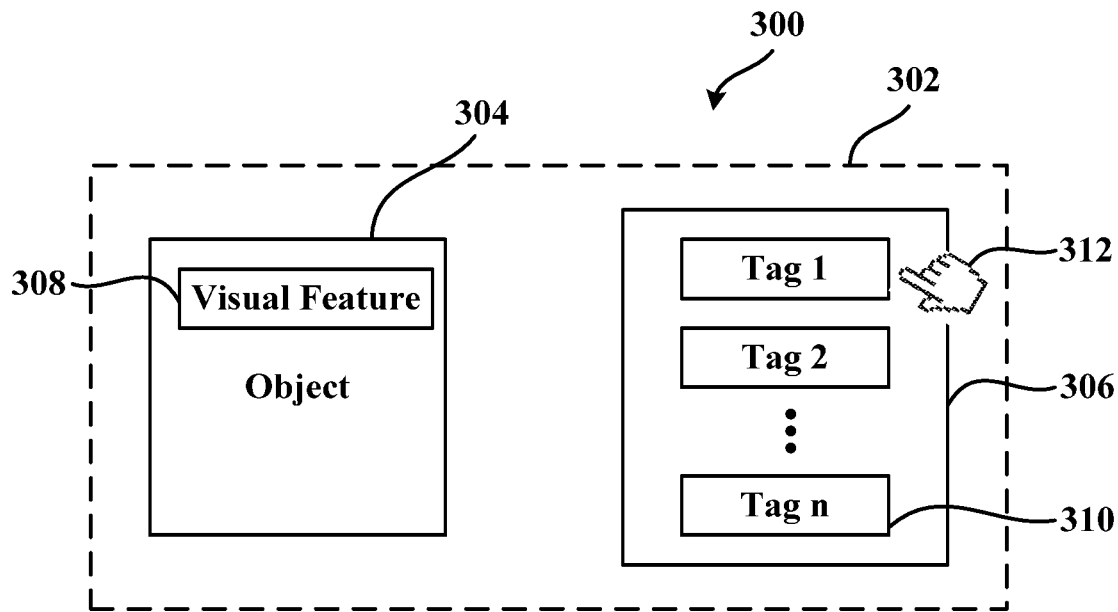
FIG. 3 illustrates a method 300 for selecting a tag according to an embodiment of the present disclosure.

FIG. 3 illustrates a method 300 for selecting a tag according to an embodiment.

As shown in FIG. 3, an observation area range 302 of the AR device is illustrated. A real object 304 and a real first predetermined area 306 are simultaneously observed in the observation area range 302. The first predetermined area 306 may be a surface of a solid object, such as a wall, a desk, or a portion of a surface on the processing line. As shown in FIG. 3, the first predetermined area 306 is separate from the object 304. As determined by the operator's observation, the object 304 has a visual feature 308 which, for example, is a damage on the surface of the object.

At the same time, the first predetermined area 306 includes at least one tags 310 (as shown in FIG. 3, including n tags), wherein each tag 310 corresponds to one type of visual feature. For example, the tags 1 to n may be displayed in said first predetermined area 306 as various color stripes having different colors, stickers having different shapes and having a same or different colors, and the like. Each tag 310 is associated with a different type of visual feature, respectively. For example, the tag 1 may be associated with the visual feature 308 to indicate that there is a damage on the surface of the object, the tag 2 may be associated with another visual feature to indicate there is a color difference on the surface the object, and so on. In addition, in some embodiments, the layout of tags 310 in the first predetermined area 310 may vary or be adjusted; and in other embodiments, the layout of tags 310 in the first predetermined region 310 may be fixed.

After the object 304 and the first predetermined area 306 are simultaneously observed, the operator may further select one of the plurality of tags 310 in the first predetermined area 306 based on the visual feature 308 of the object 304. For example, the operator may point his index finger 312 to tag 1 to indicate that tag 1 is selected. The AR device may detect the operator's gesture by, for example, a depth camera carried thereon, and determine that the tag 1 is selected.

It will be appreciated that, in some embodiments, when the object 304 includes a plurality of visual features 308, the operator may perform more than one selection of tags from the plurality of tags 310.

In addition, in other embodiments, the observation area range 302 of the AR device may not simultaneously cover both the object 304 and the first predetermined area 306. Instead, the operator may successively observe one area after another. For example, the operator may first observe the object 304 to determine the existence of a visual feature 308, and then observe the first predetermined area 306 and select one or more tags from the plurality of tags in the first predetermined area 306.

Figure 4:
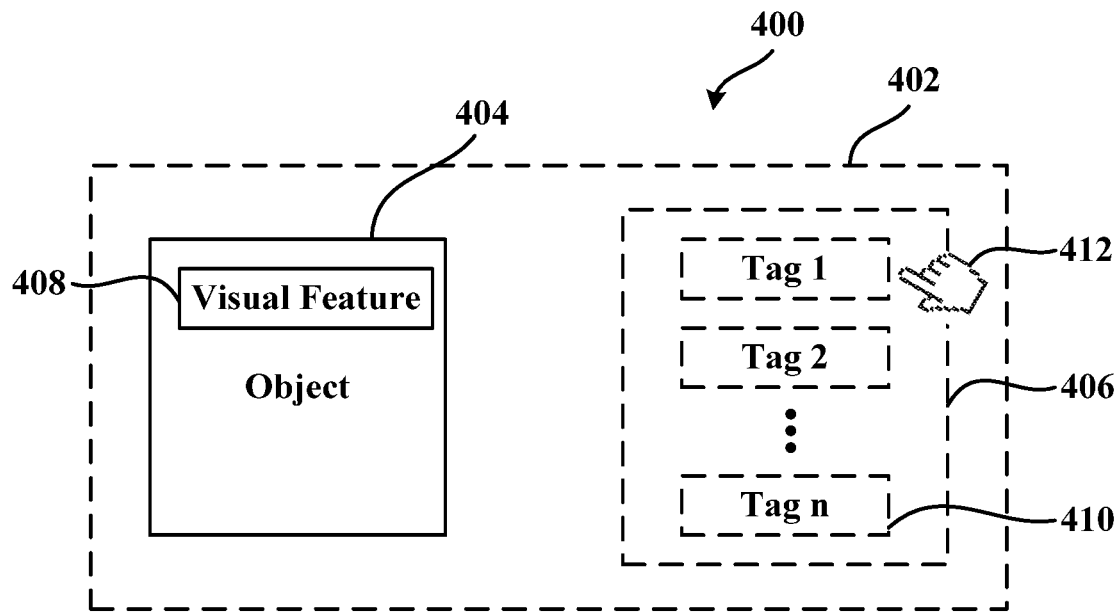
FIG. 4 illustrates a method 400 for selecting a tag according to another embodiment of the present disclosure.

FIG. 4 illustrates a method 400 for selecting a tag according to another embodiment.

As shown in FIG. 4, an observation area range 402 of the AR device is illustrated. A real object 404 and a virtual first predetermined area 406 are simultaneously observed in the observation area range 402. The first predetermined area 406 is a virtual area displayed on a display of the AR device, and said first predetermined area 406 includes at least one tag 410.

Similar to the selecting method 300 shown in FIG. 3, after the operator has observed a visual feature 408 of the object 404, a tag may be selected from the first predetermined area 406. For example, the operator may point his index finger 412 to tag 1 to indicate that the tag is selected. It will be appreciated that the operator may use other gestures to select the tag, for example, a gesture of dragging the tag to a position overlapping with the object 404.

In other embodiments, the observation area range 402 of the AR device may not simultaneously cover the object 404 and the first predetermined area 406. Instead, after the operator has observed the object 404, the first predetermined area 406 will be displayed on a display of the AR device.

Figure 5:
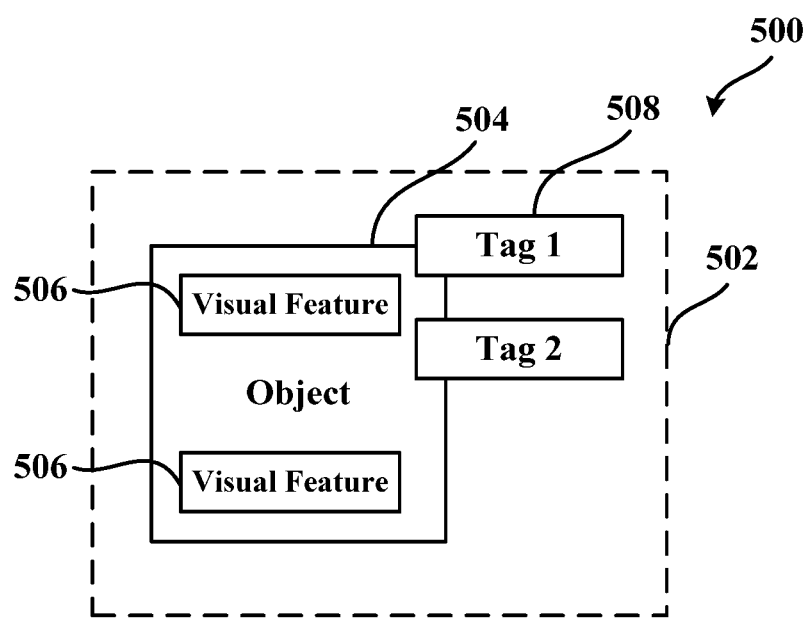
FIG. 5 illustrates a method 500 for selecting a tag according to another embodiment of the present disclosure.

FIG. 5 illustrates a method 500 for selecting a tag according to another embodiment.

As shown in FIG. 5, an observation area range 502 of the AR device is illustrated. A real object 504 is observed in the observation area range 502.

In addition, within the observation area range 502, there are also two real tags 508 (not virtual). These two real tags 508 are superimposed on the object 504, for example, pasted on the object 504. These two tags 508 may be previously selected by the operator from a plurality of tags that are not shown in the observation area range 502 of the AR device.

Accordingly, the AR device may scan the object 504 to determine said two tags 508 attached thereto. These two tags 508 indicate two types of visual features 506 existing in the object 504.

In the embodiment shown in FIG. 5, the AR device scans a second predetermined area to obtain a corresponding tag, wherein the second predetermined area is a surface of the object, or a surface adjacent to the object 504. It will be appreciated that, in some other embodiments, the AR device may scan other predetermined locations as long as tags corresponding to the observed visual features are all placed at the predetermined locations in advance.

Referring to FIG. 2 again, after at least one tag is selected, in step S206, the AR device is configured to associate the at least one selected tag with the identification information of the object.

After the tag and the identification information being associated, the AR device may store the association relationship. For example, the AR device may send data of the association relationship by wireless communication to a neighboring computer processing device, a remote database, and so on. In this way, information related to visual features of each object can be automatically processed without the need for manual input by the operator, which greatly improves the efficiency of object checking. For example, a computer processing device may instantly count objects having a certain type of visual feature, so as to determine data, such as a product defect rate. For example, the operator can easily track the object having a certain defect, and can adjust and process the object accordingly. It will be appreciated that, in some embodiments, the above information storage and processing steps may also be performed by the AR device. In addition, besides the association relationship, other data, such as the above-mentioned initiating time and end time, may be stored immediately in operation and sent to a computer processing apparatus, a remote database or the like.

In some embodiments, after step S206, the method may also include a step S208. In step S208, the AR device is used to scan a third predetermined area with a predetermined pattern to end the operation of the AR device. In other words, after step S208, the flow ends.

In some embodiments, after step S202, step S204 or step S206, it is desirable that one or more steps may be canceled, in case the operator has made some mistakes. For example, the AR device may be used to scan a fourth predetermined area having a predetermined pattern to cancel at least one of the identification obtaining step, the tag selecting step and the tag associating step previously performed. In this way, even if some mistakes are made, the operator still have an opportunity to correct them.

In some embodiments, before step S202, the method may further include an initiating step that may scan a predetermined area or a predetermined picture to generate a signal for initiating the AR device. Alternatively, in some embodiments, the AR device may also be initiated by a physical key or other means.

In some embodiments, when various steps of the method 200 are performed, the AR device may generate a corresponding prompt signal, such as an audible hint or a visual hint (displayed on the display of the AR device). In this way, the operator can easily understand the progress of the operation by following the guidance of said prompt signals.

Figure 6:
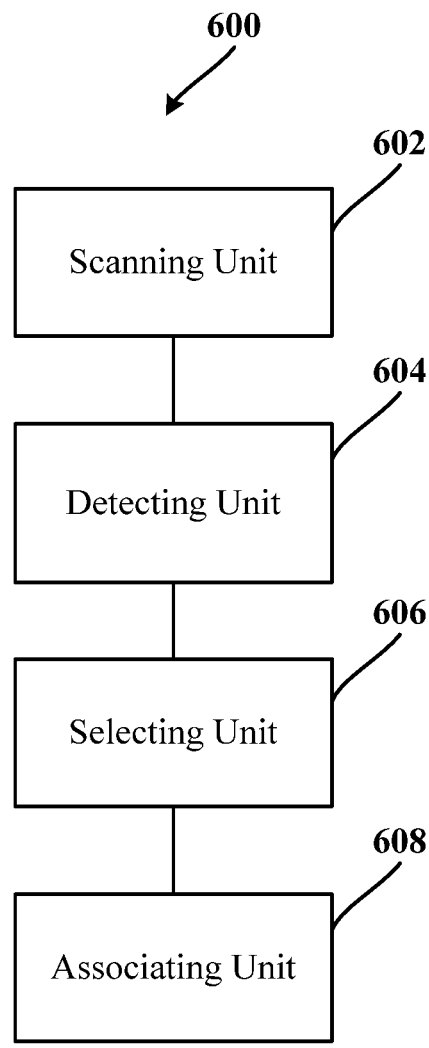
FIG. 6 illustrates an internal module diagram of an AR device 600 according to an embodiment of the present disclosure.

FIG. 6 illustrates a block diagram of an AR device 600 according to an embodiment of the present disclosure. In some embodiments, the AR device 600 may be used in conjunction with a receiving station of an object, wherein the receiving station is used to carry the object to be inspected.

As shown in FIG. 6, the AR device 600 includes a scanning unit 602 configured to scan a predetermined tag area, wherein the predetermined tag area includes at least one tag and each of the at least one tag corresponds to one type of visual feature. The AR device 600 further includes a detecting unit 604, which is configured to detect a user's selection; a selecting unit 606, which is configured to select one tag from the predetermined tag area according to the user's selection; and an associating unit 608, which is configured to associate the selected tag with identification information of the object.

The AR device 600 shown in FIG. 6 may be used to perform the method for selecting a tag shown in FIG. 3.

Figure 7:
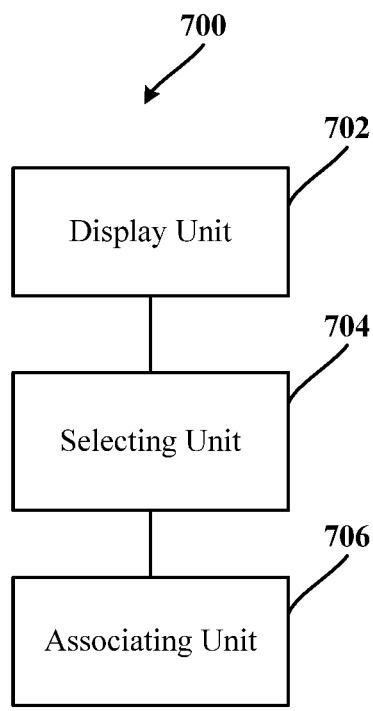
FIG. 7 illustrates an internal module diagram of an AR device 700 according to another embodiment of the present disclosure.

FIG. 7 illustrates a block diagram of an AR device 700 according to an embodiment of the present disclosure. In some embodiments, the AR device 700 may be used in conjunction with a receiving station used for carrying the object to be inspected.

As shown in FIG. 7, the AR device 700 includes a display unit 702, which is configured to display at least one tag, wherein each tag corresponds to a type of visual feature; a selecting unit 704, which is configured to detect a user's selection, so as to select one tag according to the user's selection; and an associating unit 706, which is configured to associate the selected tag with identification information of the object.

The AR device 700 shown in FIG. 7 may be used to perform the method for selecting a tag shown in FIG. 4.

Figure 8:
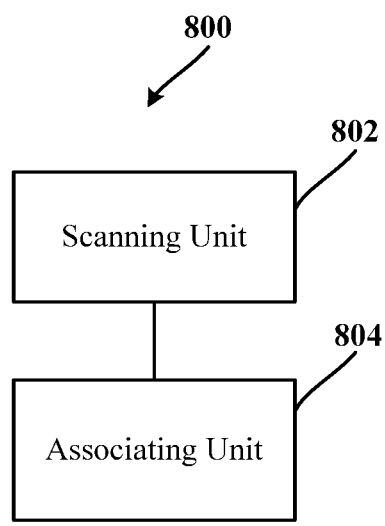
FIG. 8 illustrates an internal module diagram of an AR device 800 according to another embodiment of the present disclosure.

FIG. 8 illustrates a block diagram of an AR device 800 according to an embodiment of the present disclosure. In some embodiments, the AR device 800 may be used in conjunction with a receiving station configured for receiving and carrying the object to be inspected.

As shown in FIG. 8, the AR device 800 includes a scanning unit 802 configured to scan a predetermined tag area to obtain at least one tag, wherein the predetermined tag area includes at least one tag and each of the at least one tag corresponds to one type of visual feature. The AR device 800 further includes an associating unit 804 configured to associate said obtained tag(s) with identification information of the object.

The AR device 800 shown in FIG. 8 may be used to perform the method for selecting a tag shown in FIG. 5.

In the present disclosure, the method for identifying a feature of an object and the system for inspecting an object are particularly suitable for use in industrial production lines. The operator can wear an AR device and perform operations for identifying a feature of an object, such as identifying product defects and marking them. Because of the visual operation interface provided by the AR device, the operator can operate with their eyes and head movements, free their hands from touching various switches or buttons, so that they can focus on checking product defects. In addition, since there is no need for voice input in certain embodiments, it is also suitable for the noisy factory environment.

Other variations to the disclosed embodiments can be understood and implemented by those skilled in the art from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope. The scope and spirit of the present disclosure is defined by the appended claims.

What is claimed is:

1. A method for identifying a feature of an object based on an augmented reality (AR) device, the AR device being capable of superimposing a virtual reality scene on a real reality scene, the method comprising:
 an identification obtaining step of obtaining identification information corresponding to an object to be inspected;
 a tag selecting step of checking the object and using the AR device to select at least one tag based on a visual feature of the object, wherein the tag selecting step comprises:
  determining at least one visual feature of the object;
  providing a plurality of tags each corresponding to one type of visual feature, wherein the plurality of tags are virtual tags displayed by the AR device or real tags that can be identified by the AR device; and detecting a user's selection to the at least one tag from the plurality of tags such that the at least one selected tag is superimposed on the object within an observation range of the AR device; and a tag associating step of using the AR device to associate the at least one selected tag representing the visual feature of the object with the identification information of the object.

2. The method of claim 1, wherein the AR device is an AR glasses or an AR helmet.

3. The method of claim 1, wherein the user's selection is detected by the AR device through a gesture signal, a voice signal, a head movement signal, or a key press signal.

4. The method of claim 1, wherein the visual feature of the object indicates a defect visible to human or machine, and each of the at least one tag corresponds to one type of defect.

5. The method of claim 1, further comprising:

using the AR device to scan a third predetermined area having a predetermined pattern to end the operation of the AR device.

6. The method of claim 1, further comprising:

using the AR device to scan a fourth predetermined area having a predetermined pattern to cancel at least one of the identification obtaining step, the tag selecting step and the tag associating step.

7. The method of claim 1, wherein the object comprises a label, and the identification obtaining step comprises:

using the AR device to scan the label of the object, so as to obtain the identification information corresponding to the object.

8. The method of claim 1, further comprising:

an initiating step: scanning a predetermined area or a predetermined picture to generate a signal for initiating the AR device.

9. The method of claim 1, further comprising:

in the tag selecting step, using the AR device to generate a prompt signal corresponding to the tag.

10. The method of claim 1, further comprising:

in the tag associating step, using the AR device to generate a prompt signal corresponding to the associating operation.

11. The method of claim 9, wherein the prompt signal is an audible signal or a visual signal.

12. The method of claim 10, wherein the prompt signal is an audible signal or a visual signal.

13. The method of claim 1, further comprising:

in the tag associating step, storing the at least one tag and the associated identification information.

14. The method of claim 1, wherein the object to be inspected is provided from a factory assembly line.

* * * * *